UNITED STATES PATENT OFFICE.

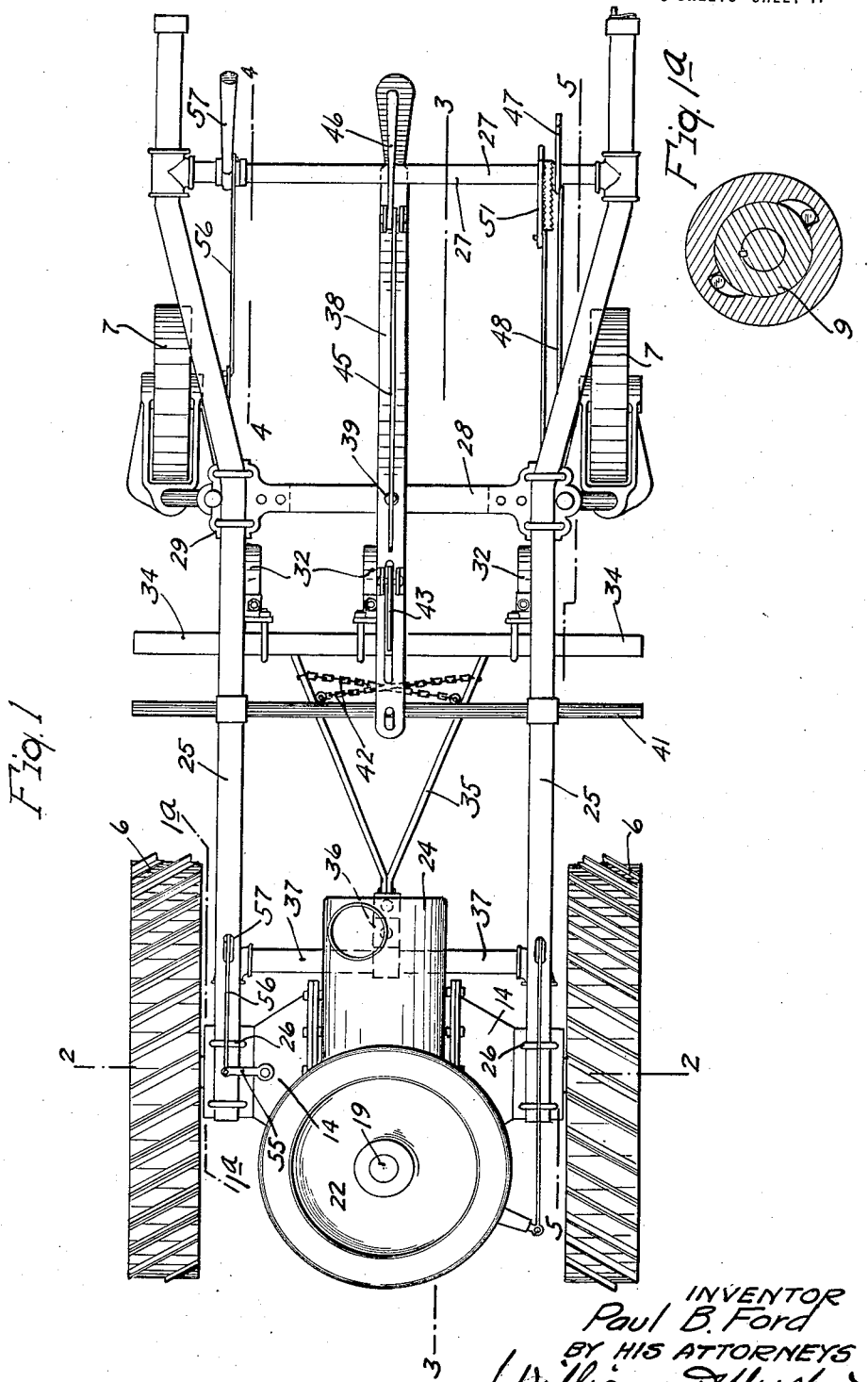

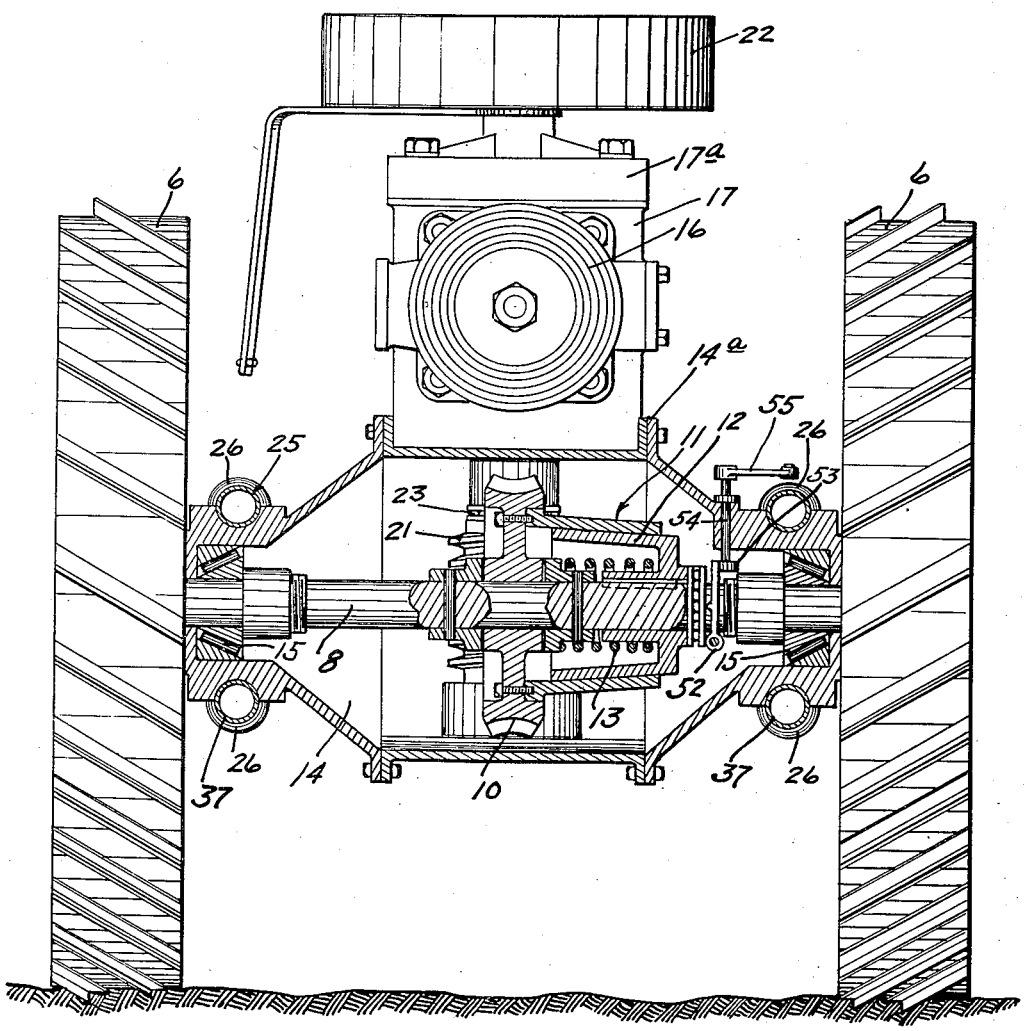

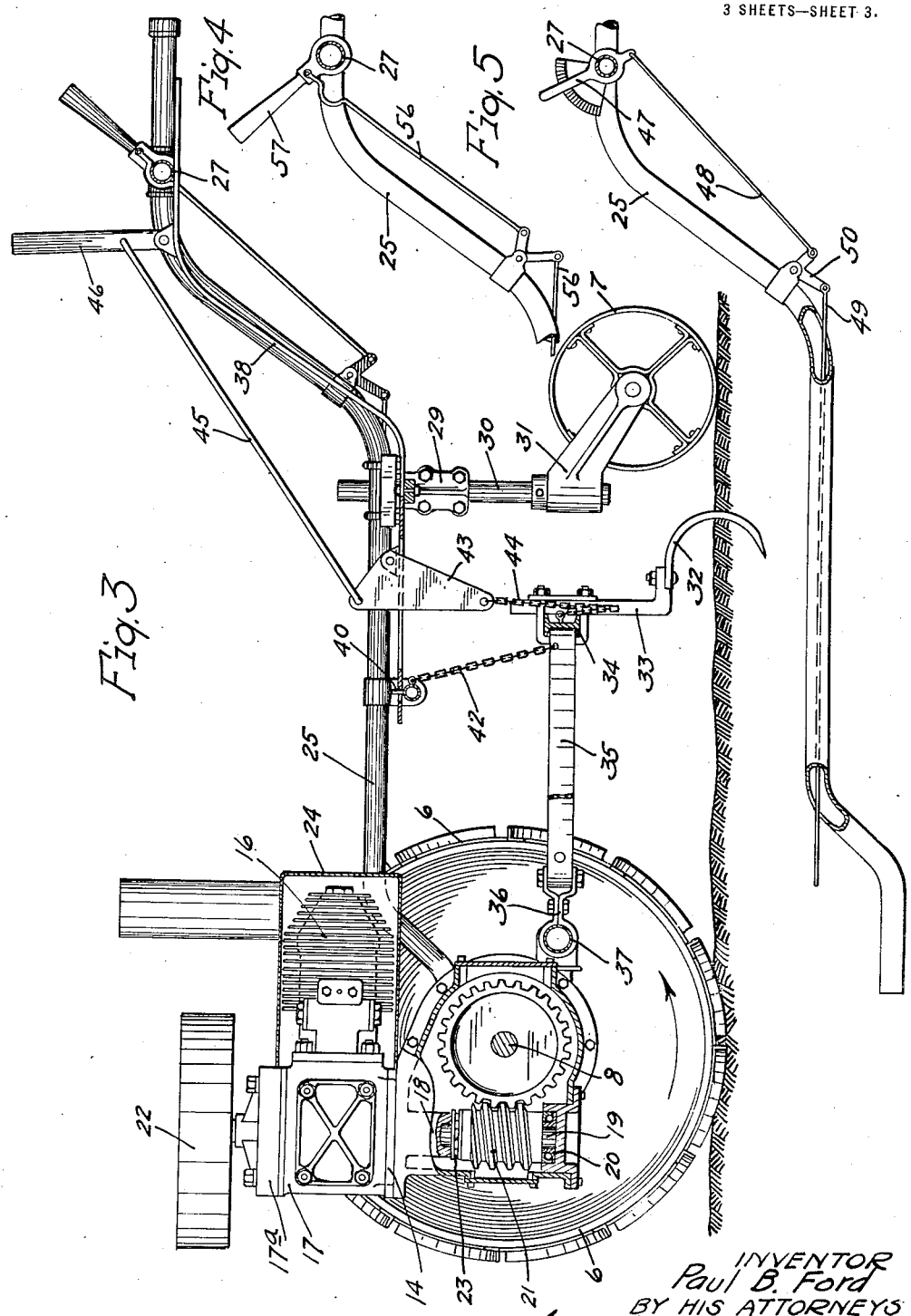

PAUL B. FORD, OF MINNEAPOLIS, MINNESOTA, ASSIGNOR TO MARKET GARDEN TRACTOR CO., OF MINNEAPOLIS, MINNESOTA, A CORPORATION.

GARDEN-TRACTOR.

1,353,156.     Specification of Letters Patent.   Patented Sept. 21, 1920.

Application filed April 18, 1919. Serial No. 291,029.

*To all whom it may concern:*

Be it known that I, PAUL B. FORD, a citizen of the United States, residing at Minneapolis, in the county of Hennepin and State of Minnesota, have invented certain new and useful Improvements in Garden-Tractors; and I do hereby declare the following to be a full, clear, and exact description of the invention, such as will enable others skilled in the art to which it appertains to make and use the same.

My invention has for its object to provide an extremely simple, highly efficient and durable small tractor especially suitable for use as a garden tractor, that is, for doing light working of the ground such as drawing a small plow, cultivating tools, or other ground working instruments such as generally used in garden cultivation.

Particularly, the invention is directed to an extremely simple and nearly direct speed reducing driving connection between the engine and the main axle, and to the disposition of the engine whereby important results are obtained. The invention also provides a housing for the rear axle, and the transmission mechanism including the clutch, and which housing serves as a supporting bed for the engine that is directly mounted thereon.

This improved tractor is illustrated in the accompanying drawings wherein like characters indicate like parts throughout the several views. Referring to the drawings:—

Figure 1 is a plan view showing the improved tractor;

Fig. 1ª is a detail in section on the line 1ª—1ª of Fig. 1, showing the ratchet-acting clutch used as a connection between the traction wheels and axle;

Fig. 2 is a rear elevation of the tractor with the housing and certain other parts sectioned on the line 2—2 of Fig. 1;

Fig. 3 is a vertical longitudinal section taken on the line 3—3 of Fig. 1;

Fig. 4 is a detail in section on the line 4—4 of Fig. 1; and

Fig. 5 is a side elevation of one of the frame bars and attached parts, some parts being sectioned on the line 5—5 of Fig. 1.

This tractor has two forwardly located laterally spaced traction wheels 6 and two relatively small laterally spaced caster wheels 7, which wheels carry the entire load. The traction wheels 6 are connected to a main driving axle 8, by any suitable form of ratchet-acting clutch which will permit either one of the traction wheels to run ahead of the axle in turning curves. In Fig. 1ª, one of these ratchet-acting clutches is indicated, as an entirety, by the numeral 9, and preferably is of the well known roller ratchet type.

Loosely journaled on the intermediate portion of the axle 8 is a worm gear 10 that is adapted to be connected, at will, to the axle 8 by means of a suitable clutch. This clutch, as shown, is of the cone type and one of the members 11 thereof is secured to the gear 10, while the other member 12 is keyed to rotate with, but to slide on the axle 8. These clutch members are normally pressed into driving engagement by spring 13 but will be disengaged by suitable lever connections presently to be described.

The worm gear and clutch and certain other parts are included within a large axle housing 14, preferably a cast structure made up of end and intermediate sections, the said end sections being contracted at their outer ends and mounted on the axle through suitable bearings 15 which, as shown, are of roller bearing type, such as the well known Timken bearings. As a motor, I employ an internal combustion engine, a small one cylinder engine being sufficient for a small tractor. The cylinder 16 of this engine is horizontally disposed and its crank case 17 to which it is, of course, rigidly secured, is, in turn, mounted directly on and rigidly secured to the top of the housing 14, the latter, as shown, in Fig. 2, being provided with flanges 14ª, between which said crank case is mounted. In fact, the top plate of the housing affords the bottom plate of the crank case 17 and separates the crank chamber from the gear chamber. Moreover, the top plate of said housing 14 has a depending integral bearing sleeve 18 through which the downwardly extended portion 19 of the engine crank shaft is projected. The lower end of the crank shaft 19 is seated in a ball-equipped thrust bearing 20 applied to the bottom plate of the housing 14. Just above the thrust bearing 20, the shaft 19 is provided with a worm 21 that runs directly in mesh with the worm gear 10 on the axle 8. The upper end of the crank shaft 19 is extended through the top plate 17ª of the crank case 17 and is provided with a fly wheel 22 that rotates in an approximately horizontal plane. A thrust bearing 23 of the ball or roller bearing type is placed between the upper hub of the worm 21 and the lower end of the bearing sleeve 18. The engine shown is of the air-cooled type and is provided with radiating fins inclosed in an air jacket 24, which, for the purposes of this case need not be further considered.

The above described arrangement of the driving connections between the engine and the driving axle, as well as the relative arrangement of the engine are highly important. The vertical disposition of the crank shaft with a fly wheel at its upper end puts a normal load on the crank shaft which resists upward thrust in the driving action, and thereby greatly relieves the thrust bearing 23 from pressure, due to the driving action. The preponderance of weight of the engine is forward of the axle 8 and the framework of the machine is held down at the rear only by devices and attachments which will presently be noted. Moreover, the engine is kept low down by the above arrangement.

The framework of the machine is of simple construction, being made up chiefly of a pair of laterally spaced bars 25 preferably made from wrought iron or steel pipe. These bars 25, at their front ends, are preferably countersunk into the tops of the end portions of the housing 14 and rigidly clamped thereto by U-bolts 26, or other suitable devices. The extreme rear ends of the bars 25 afford head pieces just forward of which said bars are tied together by a cross pipe or tie bar 27; and still farther forward said bars 25 are tied together by a main cross tie bar 28, which, at its ends, has depending split bearing sleeves 29. Upright caster wheel shanks 30 are rigidly secured in the sleeves 29 with freedom for vertical adjustments, and to the lower ends thereof, caster wheel brackets 31 are swiveled. The caster wheels 7, already noted, are journaled to these brackets 31, so that they will follow the line of travel of the front wheels, and are preferably spaced to run in the tracks of the respective traction wheels.

Cultivator teeth 32 are provided with shanks 33 rigidly secured to a transverse tool bar 34 which, in turn, is secured to the rear ends of a pronged drawbar 35. The drawbar 35, at its front end, is pivoted for lateral swinging movements to a coupling bracket 36, which, in turn, is pivoted for vertical movements on the intermediate portion of a U-shaped yoke 37, the prongs of which are bolted, or otherwise, rigidly secured to the lower portions of the ends of the housing 14.

The connections for adjusting the tool bar 34 vertically and laterally, constitute no part of the present invention, and hence, may be briefly noted as follows:

The numeral 38 indicates a combined lifting and shifting lever which is pivoted to the central portion of the cross tie 28 at 39. The front end of this lever 38 is loosely pivoted at 40 to the central portion of the shifter bar 41 mounted to slide in suitable bearings on the frame bars 25 and connected by reversely oblique chains 42 to the prongs of the drawbar 35. By lateral movements of the lever 38, the tool bar can be shifted laterally.

A bell crank 43 is pivoted to the lever 38 forward of its pivot 39 and the lower end of this bell crank is connected to the tool bar 34 by a lifting chain 44. A rod 45 connects the upper end of the bell crank 43 to a lever 46 pivoted to the rear portion of the lever 38. By rearward movement of the lever 46, the tool bar 34 may be raised and when the said lever is thrown beyond a dead center the tool bar and parts carried thereby will be locked in uplifted positions. The said combined lifting and shifting devices, while not herein claimed, are thought to be novel and may be made the subject matter of a divisional application.

The numeral 47 indicates a lever pivoted on the tie bar 27 and connected by rods 48 and 49 and bell crank 50, to the throttle valve of the engine; and the numeral 51 indicates a similar lever, which, by other suitable connections, would be connected to the timer of the ignition system. These latter noted features, however, are not herein claimed and need not be further considered.

For releasing the clutch member 12 from the clutch member 11, I provide a lever 52 pivoted to a suitable support within the housing 14 and subject to a cam head 53 on the lower end of a shaft 54 that extends through the top of the husing and is provided with an arm 55 connected by a rod 56 to an operating lever 57.

What I claim is:

1. In a tractor, the combination with a driving axle equipped with a worm gear, of a propelling engine for said tractor provided on its extended crank shaft with a worm that runs in direct mesh with said worm gear on said axle, the said crank shaft being vertically disposed in front of said worm gear and provided at its upper end with a fly wheel, the weight of which resists the upward thrust on said crank shaft in the forward driving action.

2. In a tractor, the combination with a driving axle equipped with a worm gear, of a propelling engine for said tractor provided on its extended crank shaft with a worm that runs in direct mesh with said worm gear on said axle, the said crank shaft being vertically disposed and having a fly wheel at its upper end, the cylinder of said engine being horizontally disposed and extended above said axle.

3. In a tractor, the combination with a driving axle equipped with a worm gear, of a propelling engine for said tractor provided on its extended crank shaft with a worm that runs in direct mesh with said worm gear on said axle, the said crank shaft being vertically disposed in front of said worm gear and provided at its upper end with a fly wheel, the weight of which resists the upward thrust on said crank shaft in the driving action, the cylinder of said engine being horizontally disposed and extended rearward over said axle.

4. In a tractor, the combination with a driving axle equipped with a worm gear, of a propelling engine for said tractor provided on its extended crank shaft with a worm that runs in direct mesh with said worm gear on said axle, the said crank shaft being vertically disposed in front of said worm gear and provided at its upper end with a fly wheel, the weight of which resists the upward thrust on said crank shaft in the driving action, the cylinder of said engine being horizontally disposed and extended rearward over said axle, laterally spaced traction wheels independently journaled on the ends of said axle and connected thereto by ratchet-acting clutches permitting the one wheel to run ahead of the other.

5. In a tractor, the combination with a driving axle equipped with a worm gear, of a propelling engine for said tractor provided on its extended crank shaft with a worm that runs in direct mesh with said worm gear on said axle, the said crank shaft being vertically disposed in front of said worm gear and provided at its upper end with a fly wheel, the weight of which resists the upward thrust on said crank shaft in the driving action, the cylinder of said engine being horizontally disposed and extended rearward over said axle, laterally spaced traction wheels independently journaled on the ends of said axle and connected thereto by ratchet-acting clutches permitting the one wheel to run ahead of the other, a framework extended rearward from the engine structure, and caster-wheels supporting the rear portion of said framework.

6. In a tractor, the combination with a forwardly located driving axle and laterally spaced traction wheels mounted thereon and driven thereby, of a housing mounted on said axle between said traction wheels, a framework extended rearward from said housing, a worm gear, an internal combustion engine having its cylinder horizontally disposed above said housing and having its crank chamber mounted on and directly secured to said housing, the top plate of said housing affording a bottom plate for said crank casing, the said engine having a vertically disposed crank shaft extended downward into said housing, driving connections within said housing transmitting motion from said crank shaft to said axle, and a fly wheel on the upper end of said crank shaft.

7. In a tractor, the combination with a forwardly located driving axle and laterally spaced traction wheels mounted thereon and driven thereby, of a housing mounted on said axle between said traction wheels, a framework extended rearward from said housing, a worm gear, an internal combustion engine having its cylinder horizontally disposed above said housing and having its crank chamber mounted on and directly secured to said housing, the top plate of said housing affording a bottom plate for said crank casing, the said engine having a vertically disposed crank shaft extended downward into said housing, driving connections within said housing transmitting motion from said crank shaft to said axle, and a fly wheel on the upper end of said crank shaft, the top plate of said housing having an integral bearing in the intermediate portion of said crank shaft and the bottom plate of said housing having a bearing in the lower end of said crank shaft.

In testimony whereof I affix my signature in presence of two witnesses.

PAUL B. FORD.

Witnesses:
 EVA E. KÖNIG,
 HARRY D. KILGORE.